United States Patent
Kulkarni

(10) Patent No.: US 10,318,799 B2
(45) Date of Patent: Jun. 11, 2019

(54) METHOD OF PREDICTING AN INTEREST OF A USER AND A SYSTEM THEREOF

(71) Applicant: WIPRO LIMITED, Bangalore (IN)

(72) Inventor: Saurabh Ramchandrarao Kulkarni, Pune (IN)

(73) Assignee: Wipro Limited, Bangalore (IN)

(*) Notice: Subject to any disclaimer, the term of this patent is extended or adjusted under 35 U.S.C. 154(b) by 42 days.

(21) Appl. No.: 15/475,220

(22) Filed: Mar. 31, 2017

(65) Prior Publication Data

US 2018/0232568 A1 Aug. 16, 2018

(30) Foreign Application Priority Data

Feb. 16, 2017 (IN) .............................. 201741005568

(51) Int. Cl.
- *G06K 9/00* (2006.01)
- *G10L 25/63* (2013.01)

(52) U.S. Cl.
CPC ..... *G06K 9/00335* (2013.01); *G06K 9/00302* (2013.01); *G10L 25/63* (2013.01)

(58) Field of Classification Search
CPC . G06K 9/00342; G06K 9/00302; G10L 25/63
See application file for complete search history.

(56) References Cited

U.S. PATENT DOCUMENTS

| | | | |
|---|---|---|---|
| 9,269,374 B1 | 2/2016 | Conway et al. | |
| 2014/0092242 A1 | 4/2014 | Krishnan et al. | |
| 2014/0112556 A1* | 4/2014 | Kalinli-Akbacak | G10L 25/63 382/128 |
| 2014/0249650 A1 | 9/2014 | Laghi et al. | |
| 2014/0280529 A1* | 9/2014 | Davis | H04L 67/22 709/204 |
| 2015/0112571 A1* | 4/2015 | Schmudderich | B60W 30/08 701/93 |
| 2016/0163332 A1* | 6/2016 | Un | G10L 13/08 704/260 |
| 2017/0061989 A1* | 3/2017 | Dow | G10L 25/57 |
| 2017/0076740 A1* | 3/2017 | Feast | G10L 25/63 |
| 2017/0239812 A1* | 8/2017 | Thapliya | B25J 9/163 |
| 2017/0308909 A1* | 10/2017 | Faith | G06Q 30/0201 |
| 2018/0061415 A1* | 3/2018 | Penilla | H04L 67/12 |
| 2018/0082314 A1* | 3/2018 | Faith | G06Q 30/0201 |
| 2018/0114125 A1* | 4/2018 | Ichiboshi | A61B 5/0077 |

* cited by examiner

*Primary Examiner* — Brenda C Bernardi
(74) *Attorney, Agent, or Firm* — Finnegan, Henderson, Farabow, Garrett & Dunner LLP

(57) ABSTRACT

The present disclosure discloses a method of predicting an interest of a user and a system thereof. The method comprises receiving, by the system, a first set of inputs related to the user from a first set of sensors, where one or more features of the user are extracted from the first set of inputs. The method further comprises receiving a second set of inputs related to an environment around the user from a second set of sensors, assigning weights to each input among the first set of inputs, identifying a user behavior associated with each of the one or more features of the user and predicting the interest of the user by correlating the user behavior associated with each of the one or more features of the first set of inputs and the weights assigned to each input among the first set of inputs, thus increasing accuracy of prediction.

16 Claims, 5 Drawing Sheets

US 10,318,799 B2

METHOD OF PREDICTING AN INTEREST OF A USER AND A SYSTEM THEREOF

TECHNICAL FIELD

The present disclosure relates to field of predictive analytics. More particularly, but not specifically, the present disclosure relates to a method of predicting an interest of a user and a system thereof.

BACKGROUND

In a general scenario, meeting between people takes place in a face to face manner, over calls, over video conferences, and the like. When the meeting takes place, a lot of resources and time are spent on the meeting. Thus, a person conducting the meeting would expect a positive outcome from the meeting. Often, the meeting concludes with a client's lack of agreement with the person conducting the meeting and subsequent meetings may be conducted to understand intention or interest of the client. However, the person conducting the meeting may not be certain of the client's interest in the meeting. The interest of the client can be predicted by observing certain parameters of the client during the meeting.

Traditional systems predict interest of a user by capturing a video of the meeting and analyzing the video for body postures, facial parameters, etc, of the user. However, the inputs given to the traditional systems may be misleading as the inputs include noise, thus resulting in a false prediction. Thus, the traditional systems do not provide an accurate prediction. Also, the traditional systems do not include additional sources for providing the inputs to increase accuracy of prediction.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of predicting an interest of a user. The method comprises receiving, by an interest prediction system, a first set of inputs related to the user from a first set of sensors, where one or more features of the user are extracted from the first set of inputs. The method further comprises receiving a second set of inputs related to an environment around the user from a second set of sensors, assigning weights to each input among the first set of inputs, identifying a user behavior associated with each of the one or more features of the user by comparing the one or more features with one or more predefined features and predicting the interest of the user based on the user behavior associated with each of the one or more features of the first set of inputs and the weights assigned to each input among the first set of inputs.

In one embodiment, the present disclosure discloses an interest prediction system. The interest prediction system comprises a processor and a memory, communicatively coupled to the processor. The processor is configured to receive a first set of inputs related to a user from a first set of sensors, receive a second set of inputs related to an environment around the user from a second set of sensors, extract one or more features of the user, from the first set of inputs, assign weights to each input among the first set of inputs based on the second set of inputs, identify a user behavior associated with each of the one or more features of the user by comparing the one or more features with one or more predefined features and predict the interest of the user based on the user behavior associated with each of the one or more features of the first set of inputs and the weights assigned to each input among the first set of inputs.

A non-transitory computer readable medium including instructions stored thereon that when processed by at least one processor cause a device to perform operations comprising receiving a first set of inputs related to a user from a first set of sensors, wherein one or more features of the user are extracted from the first set of inputs, receiving a second set of inputs related to an environment around the user from a second set of sensors, assigning weights to each input among the first set of inputs based on the second set of inputs, identifying a user behavior associated with each of the one or more features of the user by comparing the one or more features with one or more predefined features and predicting the interest of the user based on the user behavior associated with each of the one or more features of the first set of inputs and the weights assigned to each input among the first set of inputs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
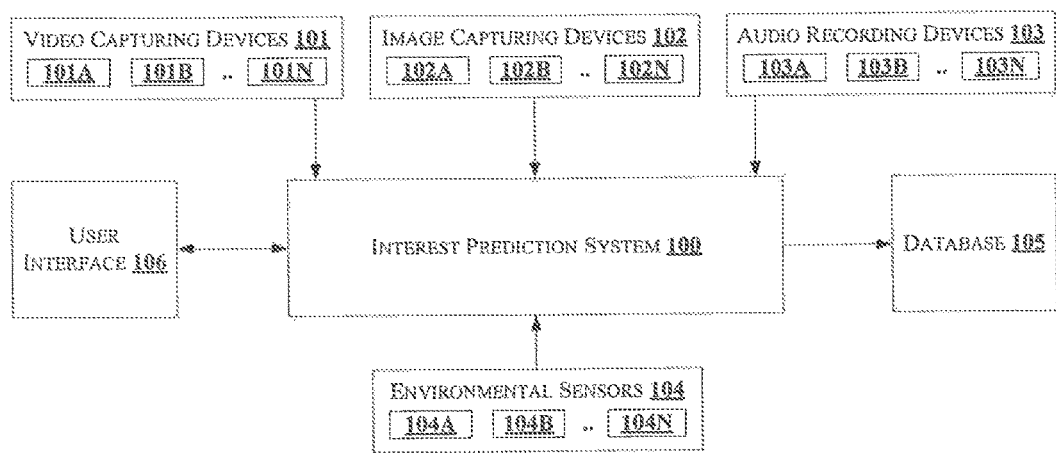
FIG. 1 illustrates an exemplary block diagram of an architecture of an interest prediction system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method of predicting an interest of a user and a system thereof. The system receives a first set of inputs from a first set of sensors related to the user and second set of inputs from a second set of sensors related to an environment around the user. Then, the system assigns weights to each input among the first set of inputs based on the second set of inputs. Further, the system identifies a user behaviour associated with one or more features extracted from the first set of inputs. Furthermore, the system predicts the interest of the user based on the user behavior and the weights assigned to each input among the first set of inputs.

FIG. 1 illustrates an exemplary block diagram of an architecture of an interest prediction system in accordance with some embodiments of the present disclosure. FIG. 1 shows an interest prediction system 100, a video capturing device 101A, a video capturing device 101B, . . . , a video capturing device 101N, an image capturing device 102A, an image capturing device 102B, . . . , an image capturing device 102N, an audio recording device 103A, an audio recording device 103B, . . . , an audio recording device 103N, an environmental sensor 104A, an environmental sensor 104B, . . . , an environmental sensor 104N, a database 105 and a user interface 106. The video capturing device 101A, the video capturing device 101B, . . . , the video capturing device 101N may be collectively represented as one or more video capturing devices 101 herein in the present disclosure. The image capturing device 102A, the image capturing device 102B, . . . , the image capturing device 102N may be collectively represented as one or more image capturing devices 102 herein in the present disclosure. The audio recording device 103A, the audio recording device 103B, . . . , the audio recording device 103N may be collectively represented as one or more audio recording devices 103 herein in the present disclosure. In an embodiment, the one or more video capturing devices 101, the one or more image capturing devices 102 and the one or more audio recording devices 103 may be represented as a first set of sensors in the present disclosure. The environmental sensor 104A, the environmental sensor 104B, . . . , the environmental sensor 104N may be collectively represented as one or more environmental sensors 104 herein in the present disclosure. The one or more environmental sensors 104 may be represented as second set of sensors in the present disclosure.

The interest prediction system 100 receives a first set of inputs from the first set of sensors and a second set of inputs from the second set of sensors. The first set of inputs are related to a user and the second set of inputs are related to an environment around the user. The interest prediction system 100 extracts one or more features of the user from the first set of inputs. The one or more features may include, but are not limited to, facial parameters of the user, body posture and audio parameters of the user. Further, the interest prediction system 100 assigns weights to each input among the first set of inputs based on the second set of inputs. Here, the interest prediction system 100 analyses the second set of inputs. In an embodiment, the second set of inputs may include, but are not limited to, temperature data, luminosity data, air composition data, air quality data and audio noise data. Based on the analysis on the second set of inputs, the interest prediction system 100 assigns weights to each input among the first set of inputs. The weights indicate which input should be provided priority. Furthermore, the interest prediction system 100 identifies a user behavior associated with each of the one or more features. The identification is performed by comparing each of the one or more features with one or more predefined features. The one or more predefined features may be stored in the database 105 associated with the interest prediction system 100. Then, the interest prediction system 100 predicts the interest of the user based on the user behavior and the weights assigned to each input among the first set of inputs.

Figure 2:
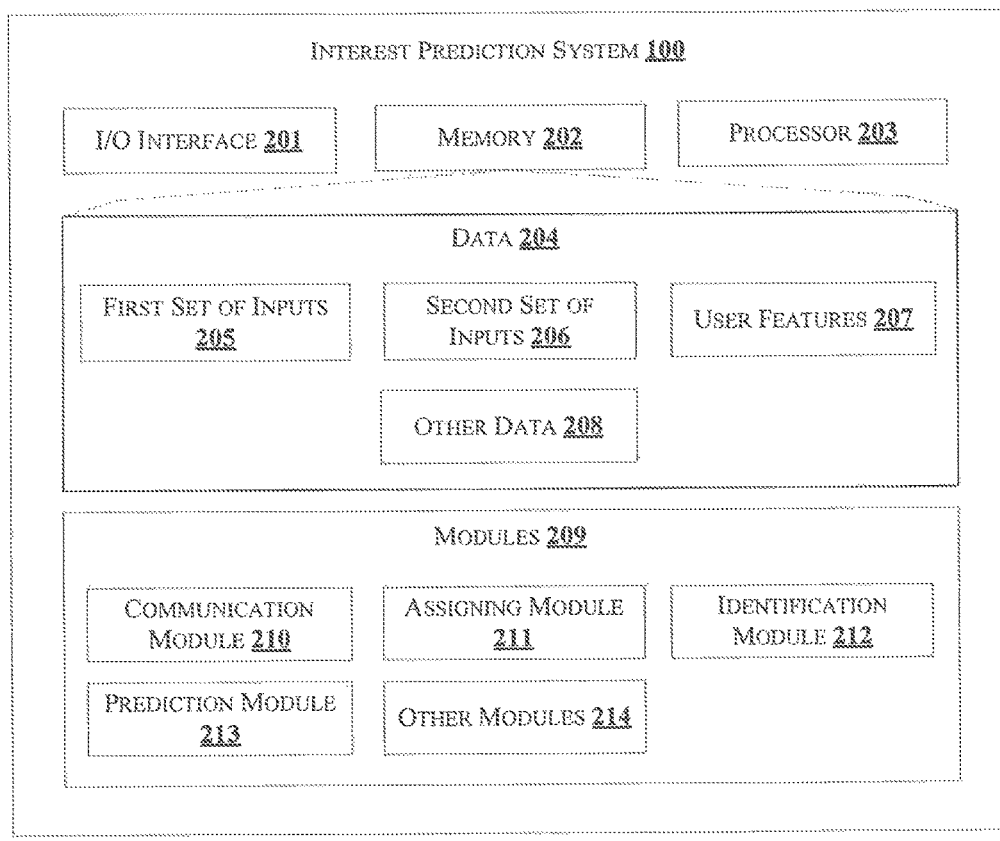
FIG. 2 shows an internal architecture of an interest prediction system in accordance with some embodiments of the present disclosure.

FIG. 2 illustrates an internal architecture of the interest prediction system 100 in accordance with some embodiments of the present disclosure. The interest prediction system 100 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The interest prediction system 100 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, a first set of inputs 205, a second set of inputs 206, one or more user features 207 of the user and other data 208.

In one implementation, the first set of inputs may include, but are not limited to, image data, video data, audio data and text data. The image data may be received from the one or more image capturing devices 102 and the video data may be received from the one or more video capturing devices 101. The image data may include one or more images of the user for predicting interest of the user. The one or more images may include, but are not limited to, the user's facial movements, and the user's postures. Likewise, the video data may include one or more video frames. The video frames may be related to the user's facial movements and the user's postures. The audio data may include the user's speech, user's tone, etc. In an embodiment, the text input may be provided by an authorized person. Here, the authorized person may be a person in charge of conducting an event. In an embodiment, the event may include, but are not limited to, a meeting, a conference, a convocation, and an assembly. The text input may include a summary of a meeting.

In an implementation, the second set of inputs may include, but are not limited to, temperature data, luminosity data, air composition data, air quality data and audio noise data. The temperature data may include temperature value of an area around the user. The luminosity data may include brightness of an area around the user. The air composition data may include percentage of various gaseous elements present in an area around the user. The air quality data may include amount of pollution of air in an area around the user. The audio noise data may include amount of environmental audio noise in an area around the user.

In an implementation, the one or more user features 207 of the user may include, but are not limited to, facial parameters of the user, body postures of the user and audio parameters of the user. Here, the facial parameters may include, but are not limited to, movement of eyes, movement of mouth, muscle contraction of face and facial expressions. The body postures may include, but are not limited to, movement of hands, movement of legs, movement of head and neck, position of hands, legs and head.

In an embodiment, the other data 208 may include user details like name of the user, occupation of the user, job description of the user, likes and dislikes of the user, hobbies, background of the user, historical data of the user related to interest prediction and the like.

In an embodiment, the data 204 in the memory 202 is processed by the one or more modules 209 of the interest prediction system 100. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The one or more modules 209 when configured with the functionality defined in the present disclosure will result in a novel hardware.

In one implementation, the modules 209 may include, for example, a communication module 210, an assigning module 211, an identification module 212, a prediction module 213 and other modules 214. It will be appreciated that such aforementioned modules 209 may be represented as a single module or a combination of different modules.

In an embodiment, the communication module 210 receives the first set of inputs and the second set of inputs from the first set of sensors and the second set of sensors respectively. Here, the first set of inputs and the second set of inputs may be subjected to various processing to refine the first set of inputs and the second set of inputs. For example, the audio data and image data may be subjected to image processing to extract the one or more features of the user. Also, image processing techniques may be employed to receive particular areas of interest from the image data and the video data. Likewise, audio data may be subjected to signal processing to refine audio quality and remove certain noises.

In an embodiment, the assigning module 211 receives the first set of inputs and the second set of inputs from the communication module 210. Further, the assigning module assigns weights to each input among the first set of input based on the second set of inputs. Here, the weights indicate priority of the inputs to be considered. Thus, the weights are assigned based on the second set of inputs. For example, when luminosity is low and audio noise level is low, the image data and the video data may be provided less weights whereas audio data may be provided more weight. Thus, assigning weights to each input among the first set of inputs helps prioritize the first set of inputs.

In an embodiment, the identification module 212 receives the one or more features of the user from the communication module 210. Further, the identification module 212 compares the one or more features of the user with one or more predefined features stored in the database 105. Based on the comparison, the identification module 212 identifies a user behavior associated with each of the one or more features. The one or more features of the user indicates a behavior of the user. Thus, the one or more features of the user are compared with one or more predefined features. When a match is found, corresponding user behavior is identified.

In an embodiment, the prediction module 213 receives the user behavior from the identification module 212 and the weights assigned to each input among the first set of inputs from the assigning module 211. Further, the prediction module 213 predicts the interest of the user based on the user behavior and the weights assigned to each input among the first set of inputs. The prediction module 213 may display result of the prediction on the user interface 106.

In an embodiment, the other modules 214 may include, but are not limited to, an audio processing module, a video processing module, an image processing module, and a notification module. The audio processing module processes the audio data received from the one or more audio recording devices 103. Likewise, the image processing module and the video processing module processes the image data and video data received from the one or more image capturing devices 102 and the one or more video capturing devices 101 respectively. The notification module may notify the interest prediction of the user.

Figure 3:
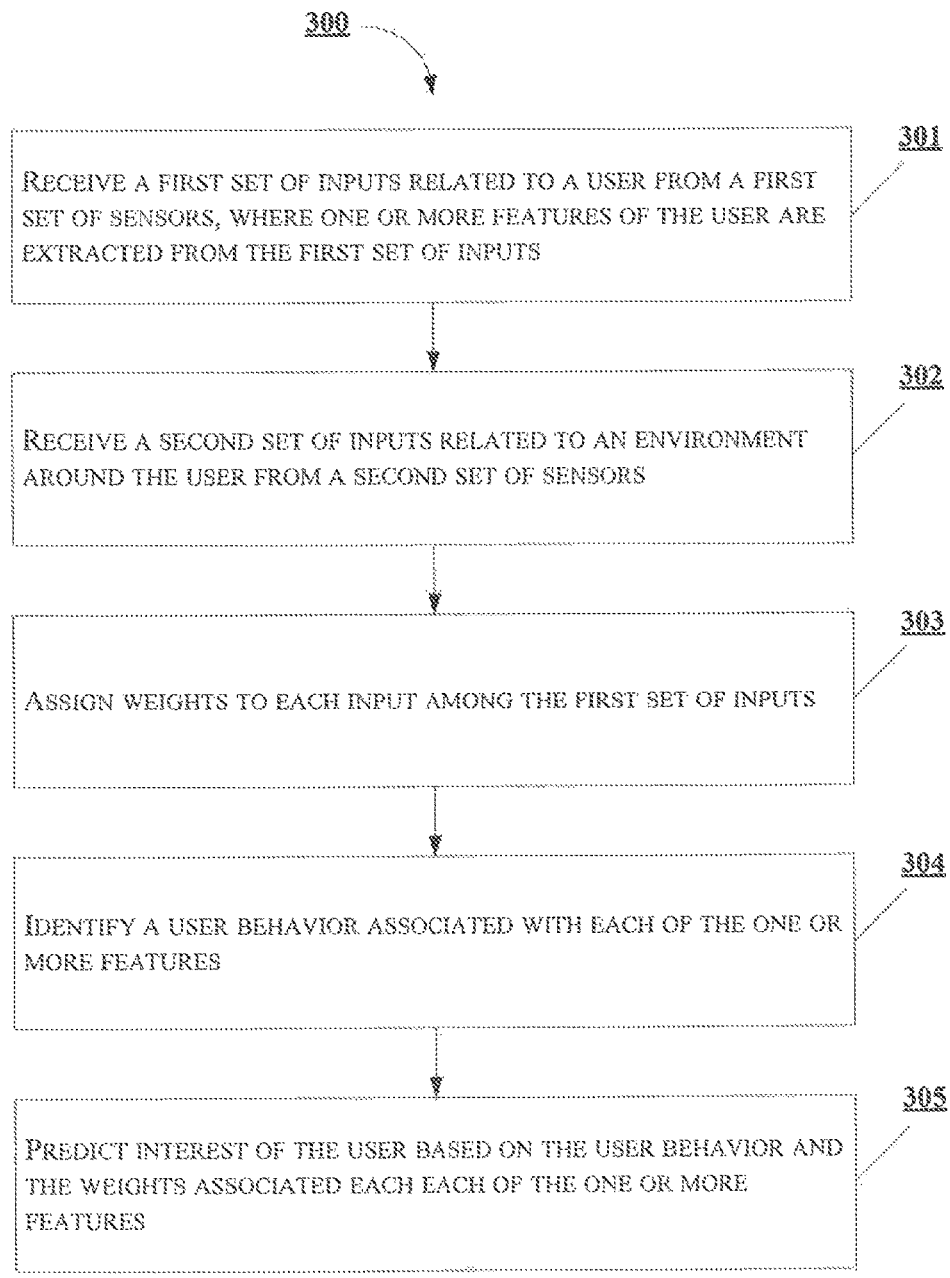
FIG. 3 shows a flowchart illustrating a method for predicting an interest of a user in accordance with some embodiments of the present disclosure.

FIG. 3 shows a flowchart illustrating a method for predicting the interest of the user, in accordance with some embodiments of the present disclosure.

As illustrated in FIG. 3, the method 300 may comprise one or more steps for predicting the interest of the user, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, receiving by the communication module 210 a first set of inputs from a first set of sensors associated with the interest prediction system 100. The first set of inputs are related to the user, for whom the interest should be predicted. The first set of inputs may be received from at least one of the one or more video capturing devices 101, the image capturing devices 102 and the one or more audio recording devices 103. The first set of inputs are pre-processed, and one or more features of the user are extracted. The pre-processing may be performed by at least one of the audio processing module, the image processing module and the video processing module.

At step 302, receiving by the communication module 210 a second set of inputs from the second set of sensors associated with the interest prediction system 100. The second set of inputs is related to the environment around the user.

At step 303, assigning by the assigning module 211 weights to each input among the first set of inputs. Here, the assigning module 211 receives the first set of inputs and the second set of inputs from the communication module 209. Then, the assigning module 211 assigns the weights to each input among the first set of inputs based on the second set of inputs. Here, value of weights assigned to an input among the first set of inputs may be more when the second set of inputs convey that the input is more reliable input among rest of the first set of inputs. Thus, the weights indicate which input among the first set of inputs gets priority over the rest of the inputs.

At step 304, identifying by the identification module 212 a behavior of the user, associated with each of the one or more features. In an embodiment, each of the one or more features of the user indicates the user behavior. In one implementation, the interest prediction system 100 may refer to psychological facts to identify the behavior of the user. The psychological facts may be stored in the database 105. Also, the one or more predefined features corresponding to the behavior may be stored in the database 105. In one embodiment, the one or more predefined features may be related to prior inputs received from the first set of sensors. Alternatively, the one or more predefined features may be pre-set by a super user. Here, the super user may be a person overseeing the interest prediction system 100. The identification module 213 receives the one or more features of the user extracted from the first set of inputs from the communication module 210. Further, the identification module 212 compares the one or more features with the one or more predefined features. During the comparison, when a match is found, the corresponding behavior is identified by the identification module 212.

At step 305, predicting by the prediction module 213 the interest of the user based on the behavior of the user and the weights assigned to each input among the first set of inputs. The prediction module 213 receives the behavior of the user from the identification module 213 and the weights assigned to each input among the first set of inputs from the assigning module 211. Then, the prediction module 213 correlates inputs with higher weight and behavior of the user identified from the input. In one embodiment, the prediction module 213 may predict the interest of the user based on the behavior identified using the input assigned with higher value of weight. Alternatively, the prediction module correlates each of the input and the behavior identified using that input. Further, the prediction module 213 determines a weighted average and predicts the interest of the user.

Figure 4:
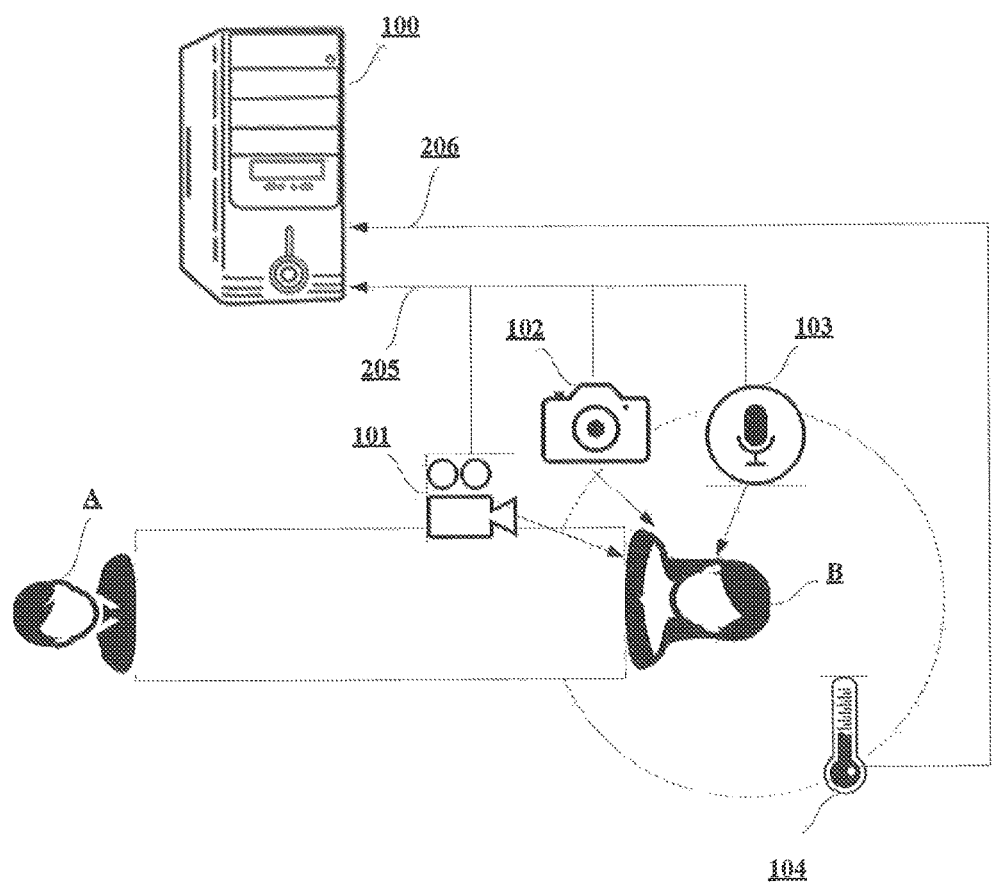
FIG. 4 shows an exemplary representation of a scenario for predicting an interest of a user in accordance with some embodiments of the present disclosure.

FIG. 4 shows an exemplary representation of an example scenario for predicting an interest of a user in accordance with some embodiments of the present disclosure.

In an embodiment, the psychological facts define examples of behavior based on the one or more features of the user. Examples are listed in Table 1:

TABLE 1

| USER FEATURES | BEHAVIOR |
| --- | --- |
| Leaning closer to a person | Positive body language |
| Relaxed, uncrossed limbs | Positive body language |
| Long periods of eye contact | Positive body language |

TABLE 1-continued

| USER FEATURES | BEHAVIOR |
| --- | --- |
| Leaning away from a person | Negative body language |
| Crossed arms or legs | Negative body language |
| Looking away to a side | Negative body language |
| Rubbing/scratching eyes, nose or neck | Negative body language |

Table 1 shows only an example of the one or more features of the user and the corresponding behavior as defined by the psychological facts. The present disclosure may refer to other features of the user as defined in the psychological facts or the like. For example, consider a meeting between two people A and B, as shown in FIG. 4. Let A be a host and B be a guest. Let B indicate signs for example, leaning towards A, sitting with crossed legs, frequently rubbing eyes, and arguing with A. Here, the interest prediction system 100 receives the first set of inputs from the first set of sensors. Particularly, the interest prediction system 100 receives video data from the one or more video capturing devices 101, image data from the one or more imaging devices 102 and audio data from the one or more audio recording devices 103. Further, let the interest prediction system 100 receive the second set of inputs from the second set of sensors. Let the second set of inputs comprise luminosity data and audio noise data, collectively shown as 104 in FIG. 4. For illustration, let the luminosity data indicate less brightness in the surrounding of the user. Let the audio noise data indicate less environmental noise from the surroundings of the user. Further, the assigning module 211 of the interest prediction system 100 dynamically assigns weights to the inputs based on the second set of inputs. In this illustration, let the assigning module assign a weight of 60% to the inputs received from the one or more audio recording devices 103, a weight of 30% to the inputs received from the one or more video capturing devices 101 and a weight of 10% to the inputs received from the one or more image capturing devices 102. Here, the inputs received from the one or more audio recording device 103 is assigned a greater weight as the inputs received are more reliable compared to the inputs received from the one or more video capturing devices 101 and the one or more image capturing devices 102. From the second set of inputs, it is certain that audio input is more certain and may provide more information than visual data received from the one or more video capturing devices 101 and the one or more image capturing devices 102.

Further, the identification module 212 identifies behavior corresponding to each of the one or more features of the user extracted from the first set of inputs. The one or more features and the corresponding behavior are as shown in Table 2 by referring to Table 1:

TABLE 2

| FEATURES of B | BEAHAVIOR | INPUT SENSOR |
| --- | --- | --- |
| Leaning towards A | Positive body language | Image capturing device |
| Crossed legs | Negative body language | Image capturing device |
| Frequently rubbing eyes | Negative body language | Video capturing device |
| Frequently arguing with A | Negative body language | Audio recording device and video capturing device |

From Table 2, the prediction module 213 receives the behavior associated with each input. Further, the prediction module 213 receives the weights assigned from the assigning module 212. Further, the prediction module analyses the received data and predicts that the user does not have interest in the meeting or discussion. The prediction is made as weight of the inputs received from the audio recording devices 103 is high as compared to the inputs received from the video capturing devices 101 and the image capturing devices 102. Also, the behavior identified using the inputs received from the audio recording devices 103 correspond to negative body language, therefore the prediction module 213 predicts that the user does not have interest in the meeting.

In an embodiment, when inputs are not available from the one or more video capturing devices 101, the one or more image capturing devices 102 or the one or more audio recording devices 103, the interest prediction system 100 may receive a text input.

In an embodiment, the interest prediction system 100 may employ machine learning algorithms to predict the interest of the user. The machine learning algorithms may predict the interest based on historical data.

In an embodiment, the interest prediction system 100 may display results of the prediction on the user interface 106. For example, the one or more features showing positive behavior can be represented by green colour and the one or more features showing negative behavior can be represented by red colour.

Computer System

Figure 5:
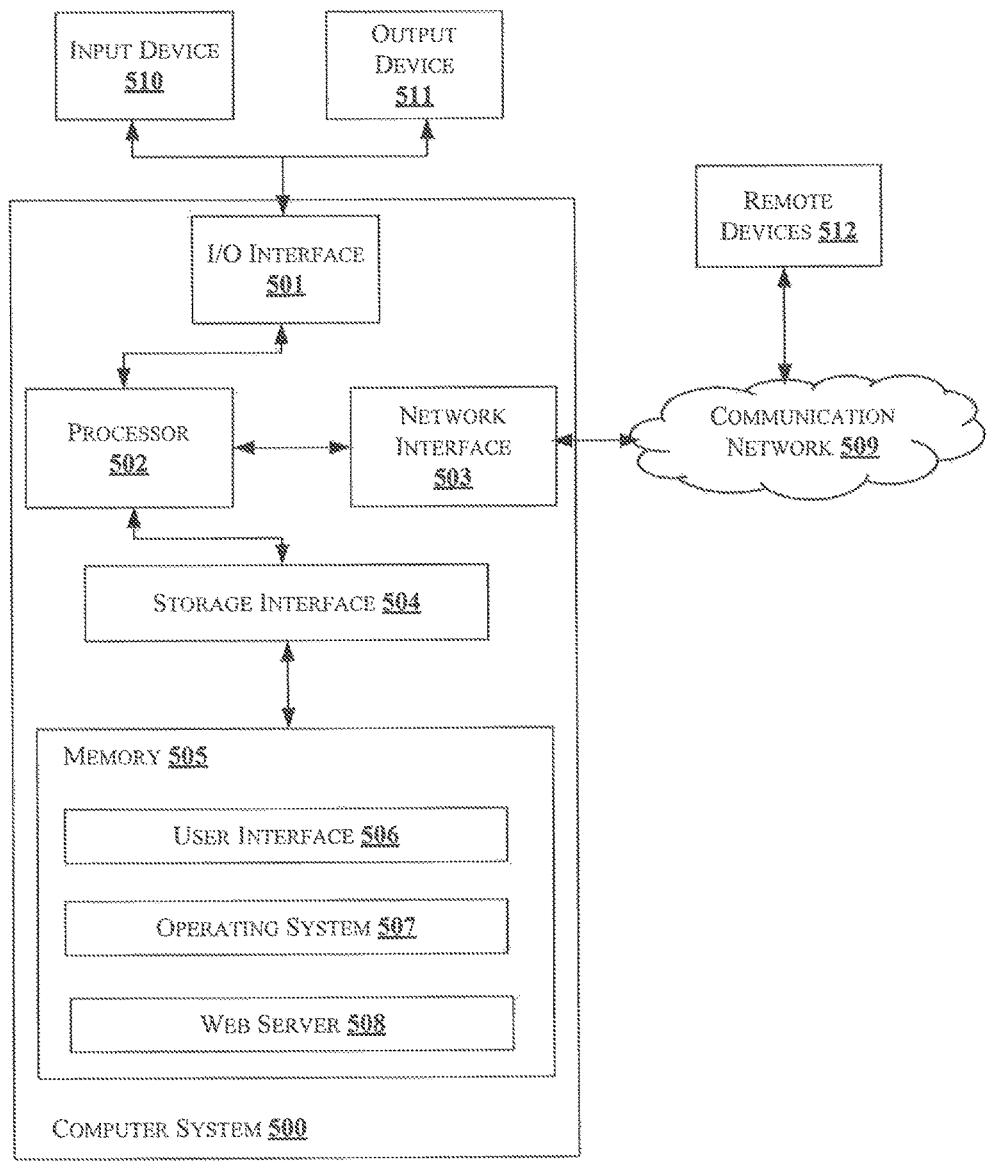
FIG. 5 shows a general-purpose computer system for predicting an interest of a user in accordance with some embodiments of the present disclosure.

FIG. 5 illustrates a block diagram of an exemplary computer system 500 for implementing embodiments consistent with the present disclosure. In an embodiment, the computer system 500 is used to implement the method of predicting an interest of a user. The computer system 500 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet twisted pair 10/100/1000 Base T), transmission control protocol/Internet protocol (TCP/IP), token ring, IEEE 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 503 and the communication network 509, the computer system 500 may communicate with the one or more service operators.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394 Universal Serial Bus (USB), fibre channel, Small Computer Systems Interface (SCSI), etc. The memory drives may further include a drum, magnetic disc drive, magneto-optical drive, optical drive. Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

In an embodiment, the computer system 500 may receive inputs from remote devices 512 connected to the computer system 500 through the communication network 509.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to" unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure predicts interest of a user accurately, by considering optimal input sources.

In an embodiment, the method and system helps reduce resources and time considerably, for predicting interest of a user. The prediction helps a host user to decide whether additional resources and time should be spent on the user.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Interest prediction system |
| 101 | Video capturing devices |
| 102 | Image capturing devices |
| 103 | Audio recording devices |
| 104 | Environmental sensors |
| 201 | Database |
| 202 | User interface |
| 203 | Processor |
| 204 | Data |
| 205 | First set of inputs |
| 206 | Second set of inputs |
| 207 | User features |
| 208 | Other data |
| 209 | Modules |
| 210 | Communication module |
| 211 | Assigning module |
| 212 | Identification module |
| 213 | Prediction modules |
| 214 | Other modules |
| 500 | Computer system |
| 501 | I/O Interface |
| 502 | Processor |
| 503 | Network interface |
| 504 | Storage interface |
| 505 | Memory |
| 506 | User Interface |
| 507 | Operating system |
| 508 | Web server |
| 509 | Communication network |
| 510 | Input devices |
| 511 | Output devices |
| 512 | Remote devices |

What is claimed is:

1. A method of predicting an interest of a user, the method comprising:

receiving, by an interest prediction system, a first set of inputs related to the user from a first set of sensors, wherein one or more features of the user are extracted from the first set of inputs, wherein the first set of inputs comprises image data and audio data;

receiving, by the interest prediction system, a second set of inputs related to an environment around the user from a second set of sensors, wherein the second set of inputs comprises luminosity data of the image data and audio noise data of the audio data;

assigning, by the interest prediction system, weights to the image data and the audio data among the first set of inputs based on the second set of inputs, a higher weight being assigned to one of the image input or the audio input if the second set of inputs convey that the one of the image input or the audio input is a reliable input among the first set of inputs;

identifying, by the interest prediction system, a user behavior associated with each of the one or more features of the user by comparing the one or more features with one or more predefined features corresponding to the user behavior; and predicting, by the interest prediction system, the interest of the user by correlating the user behavior associated with each of the one or more features of the first set of inputs and the input assigned with higher weight among the first set of inputs.

2. The method of claim 1, wherein the first set of inputs further comprises at least one of video data, and text data.

3. The method of claim 1, wherein the second set of inputs further comprises at least one of temperature data, humidity data, air composition data, and air quality data.

4. The method of claim 1, wherein the one or more features comprises at least one of body postures of the user, facial parameters of the user and audio parameters of the user.

5. An interest prediction system, comprising:
a processor; and
a memory, communicatively coupled to the processor, which stores processor executable instructions, which, on execution causes the processor to:
receive a first set of inputs related to a user from a first set of sensors, wherein one or more features of the user are extracted from the first set of inputs, wherein the first set of inputs comprises image data and audio data;
receive a second set of inputs related to an environment around the user from a second set of sensors, wherein the second set of inputs comprises luminosity data of the image data and audio noise data of the audio data;
assign weights to the image data and the audio data among the first set of inputs based on the second set of inputs, a higher weight being assigned to one of the image input or the audio input if the second set of inputs convey that the one of the image input or the audio input is a reliable input among the first set of inputs;
identify a user behavior associated with each of the one or more features of the user by comparing the one or more features with one or more predefined features corresponding to the user behavior; and
predict the interest of the user by correlating the user behavior associated with each of the one or more features of the first set of inputs and the input assigned with higher weight among the first set of inputs.

6. The interest prediction system of claim 5, wherein the first set of inputs further comprises at least one of video data, and text data.

7. The interest prediction system of claim 5, wherein the first set of sensors comprises at least one of image capturing devices, video capturing devices, audio recording devices and user interface.

8. The interest prediction system of claim 5, wherein the second set of inputs further comprises at least one of temperature data, humidity data, air composition data, and air quality data.

9. The interest prediction system of claim 5, wherein the second set of sensors comprises at least one of temperature sensors, luminosity sensors, humidity sensors, air monitor sensors and sound sensors.

10. The interest prediction system of claim 5, wherein the one or more features comprises at least one of body postures of the user, facial parameters of the user and audio parameters of the user.

11. A non-transitory computer readable medium including instructions stored thereon that when processed by at least one processor cause a device to perform operations comprising:
receiving a first set of inputs related to a user from a first set of sensors, wherein one or more features of the user are extracted from the first set of inputs, wherein the first set of inputs comprises image data and audio data;
receiving a second set of inputs related to an environment around the user from a second set of sensors, wherein the second set of inputs comprises luminosity data of the image data and audio noise data of the audio data;
assigning weights to the image data and the audio data among the first set of inputs based on the second set of inputs, a higher weight being assigned to one of the image input or the audio input if the second set of inputs convey that the one of the image input or the audio input is a reliable input among the first set of inputs;
identifying a user behavior associated with each of the one or more features of the user by comparing the one or more features with one or more predefined features corresponding to the user behavior; and
predicting the interest of the user by correlating the user behavior associated with each of the one or more features of the first set of inputs and the input assigned with higher weight among the first set of inputs.

12. The medium of claim 11, wherein the first set of inputs further comprises at least one of video data, and text data.

13. The medium of claim 11, wherein the first set of sensors comprises at least one of image capturing devices, video capturing devices, audio recording devices and user interface.

14. The medium of claim 11, wherein the second set of inputs further comprises at least one of temperature data, humidity data, air composition data, and air quality data.

15. The medium of claim 11, wherein the second set of sensors comprises at least one of temperature sensors, luminosity sensors, humidity sensors, air monitor sensors and sound sensors.

16. The medium of claim 11, wherein the one or more features comprises at least one of body postures of the user, facial parameters of the user and audio parameters of the user.

* * * * *